MAGNETIC CORE DRIVER AND INHIBIT CIRCUIT
Filed June 25, 1963
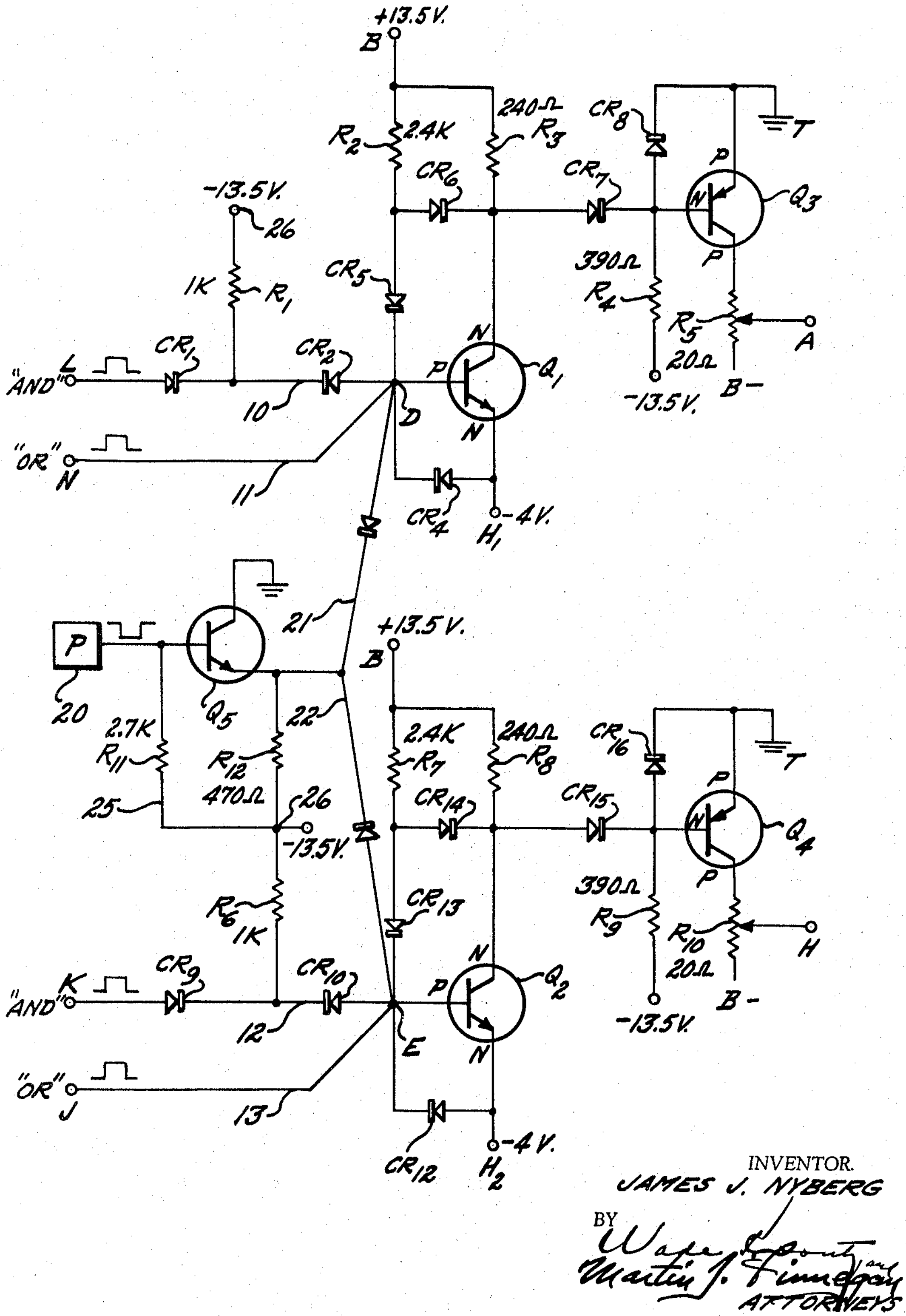
INVENTOR.
JAMES J. NYBERG
BY
Wade Koontz
Martin J. Finnegan
ATTORNEYS United States Patent Office 3,313,949
Patented Apr. 11, 1967

3,313,949

MAGNETIC CORE DRIVER AND INHIBIT CIRCUIT

James J. Nyberg, Woodland Hills, Calif., assignor to the United States of America as represented by the Secretary of the Air Force Filed June 25, 1963, Ser. No. 290,572
2 Claims. (Cl. 307—88)

This invention relates to intelligence recording, and particularly to the recording of "and," "or," and related signals by use of "logic" circuitry.

In logic circuitry the presence or absence of an electrical pulse, in any given pulse transmitting period, denotes whether a condition to be monitored has occurred or has not occurred, according to the code pattern pre-assigned to the circuitry.

In digital computers supplied with coded signals previously stored in magnetic memory cores, it is important to have a reliable method of inhibiting the unintentional storage of "1" signals during writing cycles marked by false logic input to the "flip-flop" two-state devices controlling the signal storage operations. The present invention provides such a method, and novel means for practicing it.

In the drawing, a pair of NPN transistors $Q_1$ and $Q_2$ combine with a pair of PNP transistors $Q_3$ and $Q_4$, and associated diodes CR1 to CR16, inclusive, and resistors R1 to R10, inclusive, to provide two parallel gating circuits operable alternately in response to the application of an "or" signal pulse to input N or input pin J, as the case may be, while an "AND" signal pulse applied to input pin L, or pin K, is buffered by diode CR2, or CR10.

"Trimpot" potentiometers R5 and R10 are adjustable to adjust the output currents of the two circuits to 220 milliamperes, at the points A and H, respectively, leading to the memory core planes of the signal storage unit, not shown. Input leads 10 and 11 join at junction point D, leading to transistor $Q_1$ and leads 12 and 13 join at junction point E, leading to transistor $Q_2$. Emitter leads from $Q_1$ and $Q_2$ carry the same negative voltage (—4 volts) as is applied to the novel error eliminating protective circuit, now to be described.

An error inhibiting circuit, including an additional transistor $Q_5$, is interposed between a clock pulse generator 20 and the input junction points D and E, by way of buffer diodes CR3 and CR4, respectively, in the branches 21, 22, on the emitter follower output side of transistor $Q_5$. As noted above, the clock pulses supplied to the base of transistor $Q_5$ are of —4 volts in magnitude, which is not enough to prevent activation of the selected memory core connecting with output A, or H, as the case may be, in any pulse cycle marked by a true logical input at either gate N or gate J. However, on the occurrence of a false input at either N or J, the emitter follower leads 21 and 22 will both carry sufficient additional voltage to activate both memory cores fed by terminals A and H (by way of $Q_1$-$Q_2$-$Q_3$- and $Q_4$) to enter a "zero" signal therein, and thereby prevent the entry of a "1" signal into either one of the cores. This additional voltage will be supplied by way of booster lead 25 tapping into the base circuit of transistor $Q_5$ and delivering thereto the additional voltage supplied by way of AND lead 12 (or 10) both of which tap into lead 25 at junction point 26.

What I claim is:

1. In a signal storage system, a pair of parallel circuits coupled to magnetic cores, said circuit to receive, selectively, a "1" or "0" signal pulse, means for sending such a signal pulse to a selected one of said parallel circuits, and means for sending an inhibit pulse to both said parallel circuits, simultaneously, in response to false operation of said first-named sending means, wherein said inhibit pulse sending means includes a clock pulse-driven transistor having an emitter follower output, and branching circuits connecting said emitter follower output to said parallel circuits.

2. In the signal storage system of claim 1, means including AND circuits interposed between said signal sending means and said transistor to control the voltage response of said transistor in accordance with the truth or falsity of the logic input to said signal sending means.

References Cited by the Examiner

UNITED STATES PATENTS 3,188,499 6/1966 Xylander -------- 307—88.5 X

BERNARD KONICK, *Primary Examiner.*

S. M. URYNOWICZ, *Assistant Examiner.*